April 17, 1951   R. B. NELSON   2,549,511
APPARATUS FOR UNIFORM HEATING WITH
ELECTROMAGNETIC FIELDS Filed Nov. 7, 1947   2 Sheets-Sheet 1

Inventor:
Richard B. Nelson.
by Harry R. Mayers
His Attorney.

Inventor:
Richard B. Nelson,
by Harry R. Mayers
His Attorney.

Patented Apr. 17, 1951

2,549,511

UNITED STATES PATENT OFFICE 2,549,511

APPARATUS FOR UNIFORM HEATING WITH ELECTROMAGNETIC FIELDS

Richard B. Nelson, Schenectady, N. Y., assignor to General Electric Company, a corporation of New York Application November 7, 1947, Serial No. 784,620

22 Claims. (Cl. 219—47)

This invention relates to methods and apparatus for heating by means of high frequency electromagnetic fields and has for its object the provision of an improved method and apparatus for producing an electromagnetic field of substantially a uniform field strength throughout the dimensions of the object to be heated whereby uniform heating at all points of the object is effected.

One of the troublesome problems in the art of heating by high frequency electromagnetic fields has been the avoidance of heat concentration at localized points within the object caused by characteristic tendencies of high frequency field patterns to produce a more intense field at some points than at others. For example, where, as is usually the case, standing wave patterns exist in the field, the field is a maximum at anti-nodal and a minimum at nodal positions separated by distance of one-quarter wave length at the frequency used. Since in practice the objects to be heated may have dimensions much greater than the very short wave lengths involved, a plurality of anti-nodal and nodal positions may occur within the object with the result that portions of the objects in the vicinity of the anti-nodal positions are heated to a substantially greater extent than those in the proximity of the nodal positions.

A number of expedients have been devised to overcome the aforementioned effect and render the heating uniform. For example, some commonly used expedients involve a constant changing of the relative positions of the field pattern within the object either by moving the object itself or the pattern itself. For various reasons these have not been as satisfactory as could be desired for all heating purposes. By the present invention there is provided a relatively simple apparatus which has the advantage that it sets up a highly uniform field pattern throughout a substantial volume having at least one principal dimension considerably greater than the free space wave length at the frequency used and which therefore avoids the necessity of moving either the object to be heated or the field pattern to solve the foregoing problem.

Figure 2:
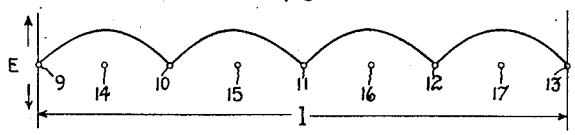
Figure 3:
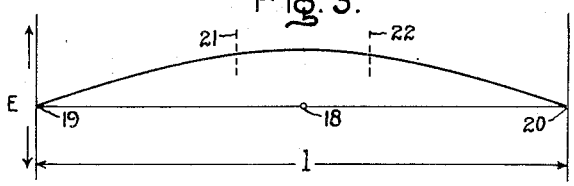
Figure 4:
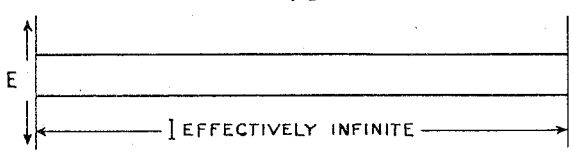
Figure 5:
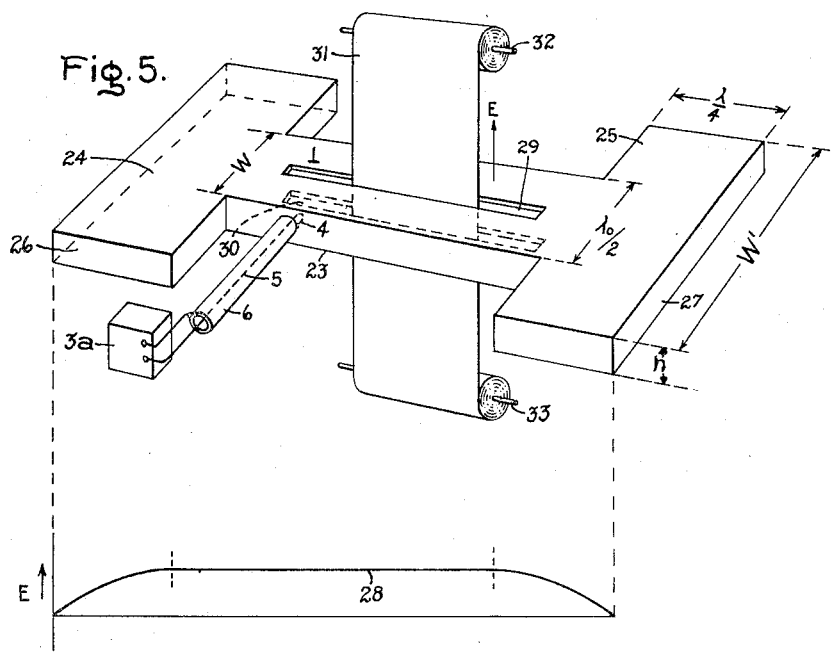
Figure 6:
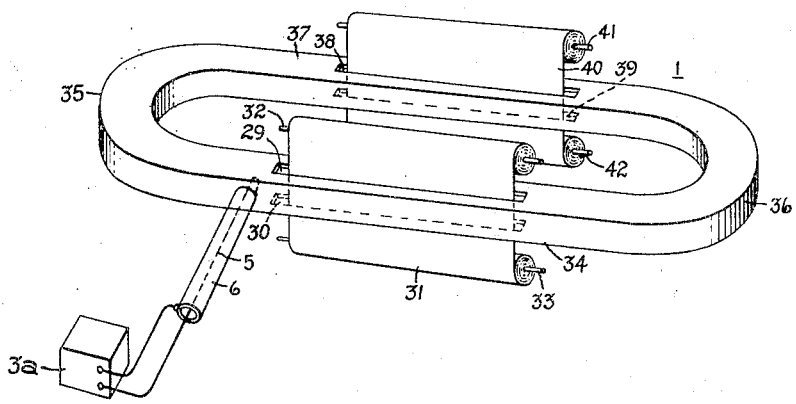

The features of the invention desired to be protected are set forth in the appended claims. The invention itself together with further objects and advantages thereof may best be understood by reference to the following specification when taken in connection with the accompanying drawings in which the Figures 1 through 4 are employed to illustrate the general principle of the invention, Fig. 1 indicating a wave guide and Figs. 2 through 4 illustrating graphically certain electrical characteristics thereof under different operating conditions; while Figures 5 and 6 represent practical embodiments of the invention in heating apparatus. In view of the similarity of figures, like numerals have been employed to designate like parts throughout.

Figure 1:
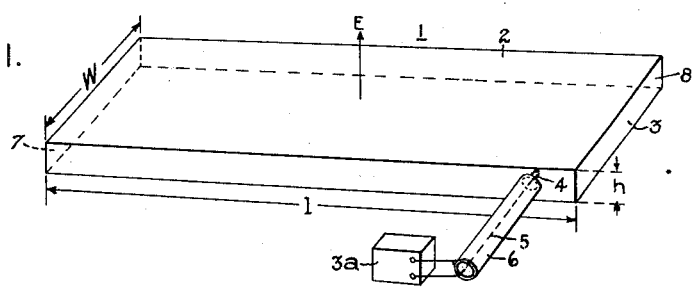

Referring now to the Figure 1 there is shown a wave guide 1 of the well known type in which high frequency electromagnetic fields may be established and which comprises simply a hollow metallic parallelepiped box having a length $l$, width $w$ and height $h$. It will be understood that a high frequency electromagnetic field having electric field lines extending between upper and lower surfaces 2 and 3 and normal thereto may be set up within such a wave guide by any suitable means illustrated, for example, by the inductive loop 4 inserted within the guide, lying in a plane perpendicular to surfaces 2 and 3, and energized by any suitable means such as an oscillator 3a connected to loop 4 through a concentric transmission line comprising inner conductor 5 and outer conductor 6. It will also be understood by those skilled in the art that if the frequency of the exciting oscillations is such that half their free space wave length is smaller than the width $w$, then a standing wave pattern lengthwise of the guide will be set up within the guide. Such a pattern may be set up regardless of whether the ends 7 and 8 are closed or open although in order to prevent the loss of energy by radiation which would be disadvantageous for heating applications, the ends are considered as closed in the illustration. An illustrative curve of such a standing wave pattern is shown in the Figure 2 wherein the ordinates represent the amplitude of the high frequency electric field strength E existing between the upper and lower surfaces of the guide 1 at any particular point along its length $l$. It will be observed that a plurality of nodal points 9, 10, 11, 12 and 13 exist in this curve, together with a plurality of anti-nodal points 14, 15, 16 and 17. Under these circumstances, if an object to be heated is placed within the guide those points of the object adjacent the anti-nodal positions will be heated to a maximum extent while those adjacent the anti-nodal positions will be subject to a low intensity high frequency field and therefore, will be heated to a minimum extent. In the intervening positions, the heating would be proportional to the ordinates or E values of the curve. This, of course, indicates the undesirable condition heretofore outlined.

The condition may be moderated to some extent by decreasing the frequency of excitation to the point where only a single half-wave length standing wave is generated lengthwise of the guide, for example, as indicated in the Figure 3, wherein the curve represents a half-wave standing wave pattern having a single anti-nodal position 18 and nodal positions 19 and 20 at its extremities, that is, at the ends of the guide. With this condition, it would be possible to obtain a substantially uniform field and consequently uniform heating throughout a relatively short distance on either side of the anti-nodal position 18, for example, the distance between dotted lines 21 and 22, and the object to be heated could be confined to that relatively short distance. However, with such a construction the portions of the guide outside the distance between the dotted lines 21 and 22 would be unused with the disadvantage not only that apparatus of relatively large physical dimension becomes necessary but also that since only a small fraction of the guide is loaded, high energy losses occur together with a high Q which makes coupling to the power supply difficult.

The condition illustrated by the Figure 3 represents the lowest frequency at which the guide 1 could be made to resonate with electric field lines perpendicular to surfaces 2 and 3 since it is known that the lowest frequency at which any finite length of wave guide is resonant is that for which the wave length in the guide is twice its physical length $l$ (assuming width $w$ greater than half the free space wave-length). Therefore, there would be no way of raising the voltage in the unused portion of the guide as illustrated by the Figure 3 type of operation except by increasing its length to impractical values. Assuming an effectively infinite guide length under these conditions, a practically very long section having substantially uniform field strength from top to bottom could be obtained. The degree of uniformity would increase as the frequency of excitation became less and less (approaching the cut-off frequency) and therefore, the wave length became longer and longer (approaching infinity). In the limiting condition, the cut-off frequency would be reached and at that frequency, the field strength would be substantially constant from upper to lower surface of the guide throughout any finite portion along the entire length $l$ as indicated by Figure 4. As is well understood by those skilled in the art, the cut-off frequency is the lowest frequency at which the guide may be made to propagate waves, that is, to maintain any substantial useful electromagnetic field along its length. Hence it is the lowest resonant frequency of an infinitely long section of wave guide and is lower than the lowest resonant frequency of any finite section. As is also known, for a guide of the character indicated by the Figure 1 with electric field lines normal to surfaces 2 and 3, cut-off occurs when the frequency of excitation drops to such a value that its corresponding free space wave length becomes equal to twice the width $w$, i. e. the free space wave length must always be equal to or less than twice $w$ in order that substantial fields may be maintained along the length $l$.

While wave guides operating under conditions indicated by the Figure 4 (and to a lesser extent by Figure 3) represent the desideratum for the purposes of high frequency heating, nevertheless, as already indicated, they are impracticable because of the extremely long lengths involved. Means must therefore be sought to shorten the length to practical ranges and at the same time, maintain the uniform field characteristics indicated. Such a result is accomplished by my present invention in accordance with the principles presently to be outlined.

If a length of the wave guide 1 of the Figure 1 of useful short length be selected, it may be made to simulate a guide of infinite length which may be excited at its cut-off frequency to simulate the field pattern of Figure 4 throughout its length (or at some higher frequency which will give it a pattern simulating that between dotted lines 21 and 22 of Figure 3) provided that the short section so chosen be terminated by impedances which simulate infinitely long guide ends. This effect may be obtained by termination of both ends with infinite impedances. An electrically open circuit would constitute such an impedance, however, for the purpose of heating, it is also necessary that no loss by power radiation occur. For that reason it does not suffice that the end of the guide simply be left open since too much radiation will occur through an open end. Whatever the terminating means be, they must therefore be closed or substantially closed by metallic walls in order to prevent the loss of energy by radiation.

One way to produce an open circuit or infinite impedance at a given point longitudinally of a guide such as guide 1 is to create a short circuit an odd number of quarter wave lengths (wave length within the guide) farther on from the point. However, at cut-off frequency for an infinitely long guide this distance becomes infinite since the wave length at cut-off frequency within such a guide is infinite. Nevertheless, in accordance with the invention, the same effect can be obtained by terminating the guide 1 by any chamber or cavity resonant at, but not itself cut off at, the frequency of excitation of guide 1. Thereby such a chamber or cavity will constitute a high impedance at the end of the guide. A suitable and simple form of such a chamber or cavity is a wave guide section of rectangular cross section closed at its outer end and resonant at the operating frequency of guide 1. Because of the lower cut off frequency, such a terminating section will not be cut off at and may resonate at the operating frequency to produce the desired terminating effect. The wave length in the terminating section will then be finite and if, for example, two such sections, one at either end of guide 1, be each a quarter wavelength long at that finite wavelength and closed at their outer ends, they will produce the infinite impedance required to terminate the intervening center section comprising the guide 1 with an effectively open circuit.

Such an arrangement is shown in Figure 5 in which a central guide section 23 corresponding to guide 1 and useful for heating purposes is terminated at each end by the closed hollow terminating guide sections 24 and 25. Each of these is made resonant at the predetermined operating frequency of guide 1 by making them an odd number of one quarter wave lengths long (finite wave length within them—not free space wave length) and closing them at their outer ends by the metallic walls 26 and 27. At the same time, because their width $w'$ is greater than the width $w$ of the central section 23, their cut-off frequency is substantially lower. With this arrangement, the field distribution lengthwise of the entire unit at the cutoff frequency of section 23 will be as indicated in the curve 28 of the Figure 5. As indicated, the field strength E within the central section 23 is substantially constant throughout its length, while within the sections 24 and 25 the field strength drops off from the value within the central section to substantially zero value at the end walls of the terminating sections.

It will be understood that the width $w$ of section 23 will preferably be equal to one half the free space wave length (or a multiple thereof) at the predetermined operating frequency (cut-off frequency of section 23) in which case the distribution of field intensity in the direction of $w$ will be such that a maximum occurs at the midpoint of each half wavelength. Also the height $h$ of section 23 is preferably less than half the free space wavelength at the predetermined operating frequency in order to preclude propagation of waves having electric field lines in the direction of width $w$.

For the purpose of introducing a suitable object to be heated, any suitable means may be provided. In the Figure 5, such means is shown as comprising a pair of slits 29 and 30 on opposite upper and lower walls of the central section 23 and so arranged that the object to be heated may be passed therethrough and thus completely through the guide. The object to be heated is illustrated, for example, by a continuous roll 31 of paper or like material which it may be desirable to heat treat for any given reason. The paper is shown as being unwound from a roller 32 passed through the slits 29 and 30 and the guide, and wound on a collecting roller 33. So long as the slits 29 and 30 are cut at the center of the lateral dimension $w$ of the central guide section 23 when its width is a half wavelength or at the point of maximum field strength in the direction of $w$ when its width is a multiple of the half wavelength there will be no leakage of power or loss of field strength through the slits. Since there is no current across a slit in this position, no power can be radiated from it. Moreover, since the electric field strength is in a direction perpendicular to the upper and lower surfaces there is no field across slits 29 and 30 from one edge thereof to the other.

As an alternative means for creating a proper terminating impedance the two ends of the wave guide 1 may be made to bend around and join each other to form a closed loop wave guide. Such a guide is shown in the Figure 6 in which the section 34 corresponding to the working section 23 of the Figure 5 is terminated by end sections 35 and 36 interconnecting a second operating section 37 all formed as a closed loop or circuit. This, in effect, constitutes a guide of infinite length and when excited at its cut-off frequency, will resonate with a substantially constant electrical field between the upper and lower surfaces at all points around its periphery. As with the arrangement of Figure 5, the material to be heated may be introduced between the upper and lower surfaces of the guide by any suitable means illustrated by the paper roll and roller mechanism similar to that of the Figure 5. It will be understood that slits 29 and 30 may be provided at any desirable point around the periphery of the guide as indicated, for example, by the second pair of slits 38 and 39 through which paper roll 40 is passed from roller 41 to 42.

While I have shown and described particular embodiments of my invention, it will be obvious to those skilled in the art that various changes and modifications may be made without departing from my invention in its broader aspects and I, therefore, aim in the appended claims to cover all such changes and modifications as fall within the true spirit and scope of my invention.

What I claim as new and desire to secure by Letters Patent of the United States is:

1. Apparatus for heating by high frequency electromagnetic fields comprising a section of hollow wave guide having means for the insertion therewithin of an object to be heated, high frequency exciting means for said section having a frequency substantially equal to the cut-off frequency of said section, and terminating structure for said section affording simulated infinite extensions of the ends of said section.

2. Apparatus for heating by high frequency electromagnetic fields comprising a section of hollow wave guide having means for the insertion therewith of an object to be heated; high frequency generating means for exciting said section to maintain an electromagnetic field throughout said section, said generating means having a frequency substantially the cut-off frequency of said section; and terminating structure for said section, said structure having substantially infinite impedance at the cut-off frequency of said section.

3. In apparatus for heating by high frequency electromagnetic fields, a substantially completely closed hollow structure and high frequency generating means for exciting said structure to maintain therein an electromagnetic field of predetermined frequency having a standing wave pattern longitudinally of said structure, said structure including a section which is substantially cut-off at said predetermined frequency and terminating sections simulating infinite extensions of the ends of said first mentioned section at said predetermined frequency.

4. Apparatus as in claim 3 in which said first mentioned section comprises a wave guide section and said terminating sections comprise wave guide sections affixed to said ends and forming with said section a continuous closed circuit.

5. Apparatus for heating by high frequency electromagnetic fields comprising a substantially completely closed hollow structure and means for exciting said structure to maintain therein an electromagnetic field of predetermined frequency having a standing wave pattern longitudinally of said structure, said structure including a section of wave guide operating substantially at cut-off at said predetermined frequency and having means for the insertion therewithin of an object to be heated, and closed chambers on each end of said section constituting substantially infinite impedances at said predetermined frequency.

6. Apparatus as in claim 5 in which said chambers have a cut off frequency lower than the cut-off frequency of said section.

7. Apparatus as in claim 5 in which said chambers are resonant at said predetermined frequency.

8. Apparatus as in claim 5 in which said last mentioned chambers comprise wave guide sections each having a length in the direction of the length of said structure substantially equal to an odd number of quarter wave lengths within said sections at said predetermined frequency.

9. Apparatus as in claim 8 in which said wave guide sections have a cutoff frequency lower than the cut off frequency of said section of wave guide.

10. Apparatus for heating by high frequency electromagnetic fields comprising a substantially closed hollow wave guide section having means for the insertion therewithin of an object to be heated, means for exciting said section at substantially the cutoff frequency thereof to maintain therein an electromagnetic field having a standing wave pattern longitudinally of said section, and substantially closed hollow chambers on each end of said section constituting substantially infinite impedances at said frequency and having a cutoff frequency substantially less than said frequency.

11. Apparatus as in claim 10 in which said means for the insertion of an object to be heated comprises an opening in one wall of said section and said electromagnetic field has electric lines of force substantially normal to said one wall.

12. Apparatus as in claim 10 in which said chambers comprise wave guide sections, said first mentioned section and said sections having rectangular cross sections transverse to the length thereof.

13. Apparatus as in claim 12 in which said means for the insertion of an object to be heated comprises an opening in one wall of said first section and said electromagnetic field has electric lines of forces substantially normal to said one wall.

14. Apparatus for heating by high frequency electromagnetic waves comprising a substantially hollow first wave guide section of rectangular cross section having openings in opposite walls thereof for the insertion therewithin of an object to be heated, means for exciting said section at substantially the cut-off frequency thereof to maintain therein an electromagnetic field having a standing wave pattern longitudinally of said section, and closed hollow wave guide sections of rectangular cross section on each end of said first section having cut-off frequencies substantially lower than the cut-off frequency of said first section and a length substantially equal to an odd number of quarter wave lengths within said sections at said first mentioned frequency.

15. Apparatus as in claim 14 in which said electromagnetic field has electric lines of force are substantially normal to said opposite walls.

16. Apparatus for heating by high frequency electromagnetic fields comprising a substantially closed hollow wave guide structure of length extending in a continuous closed path whereby said structure simulates a wave guide of infinite length, means for the insertion within said structure of an object to be heated, and means for exciting said structure at substantially the cut-off frequency thereof to maintain therein an electromagnetic field having a standing wave pattern longitudinally thereof.

17. Apparatus as in claim 16 wherein said means for the insertion of an object to be heated comprises an opening in one wall of said structure and said electromagnetic field has electric lines of force substantially normal to said one wall.

18. Apparatus as in claim 16 in which said structure has a rectangular cross section transverse to the length thereof and said means for the insertion of an object to be heated comprises openings in opposite walls of said structure and said electromagnetic field has electric lines of force substantially normal to said opposite walls.

19. Apparatus for heating by high frequency electromagnetic fields comprising a section of hollow wave guide having means for the insertion therewithin of an object to be heated; high frequency generating means for exciting said section to maintain an electromagnetic field throughout said section, said section having a width substantially equal to one-half of the free space wave length of said generating means; and terminating structure for said section affording simulated infinite extensions of the ends of said section.

20. Apparatus as in claim 3 in which said section has a height less than one-half the free wavelength of said generating means.

21. In apparatus for heating by high frequency electromagnetic fields, a substantially completely closed hollow structure and high frequency generating means for exciting said structure to maintain therein an electromagnetic field of predetermined frequency having a standing wave pattern longitudinally of said structure, said structure including a section having a width substantially equal to one-half the free space wavelength of said field and terminating sections simulating infinite extensions of the ends of said first mentioned section at said predetermined frequency.

22. Apparatus as in claim 21 in which said first mentioned section comprises a wave guide section and said terminating sections comprise wave guide sections affixed to said ends and forming with said sections a continuous closed circuit.

RICHARD B. NELSON.

REFERENCES CITED

The following references are of record in the file of this patent:

UNITED STATES PATENTS

| Number | Name | Date |
|---|---|---|
| 2,364,526 | Hansell | Dec. 5, 1944 |
| 2,457,695 | Liskow | Dec. 28, 1948 |
| 2,479,650 | Tiley | Aug. 23, 1949 |

OTHER REFERENCES

"Engineering Abstracts," Product Engineering, January 1947, pages 137–140, particularly pages 137, 138 and 139.